Figure 1:
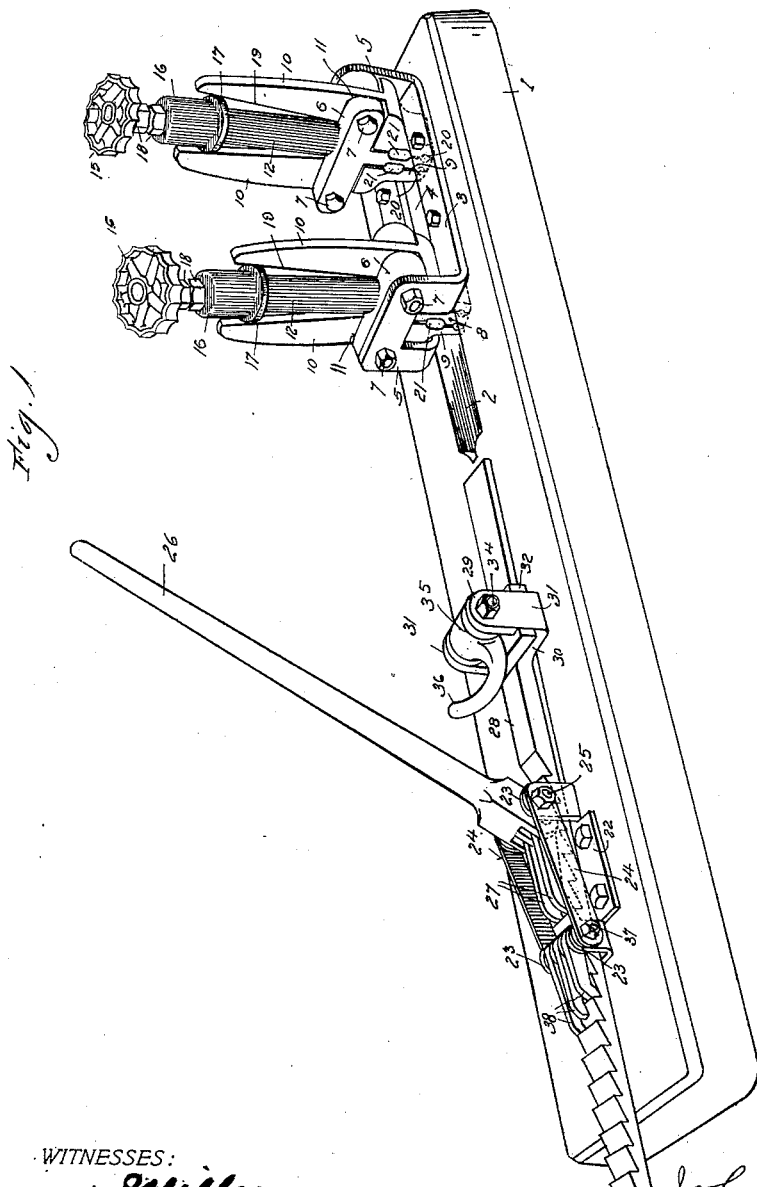

No. 697,000. Patented Apr. 8, 1902.
J. NEARY.
APPARATUS FOR APPLYING RUBBER TIRES TO VEHICLE WHEELS.
(Application filed June 3, 1901.)
(No Model.) 2 Sheets—Sheet 1.

WITNESSES:
INVENTOR.
John Neary
BY
ATTORNEY.

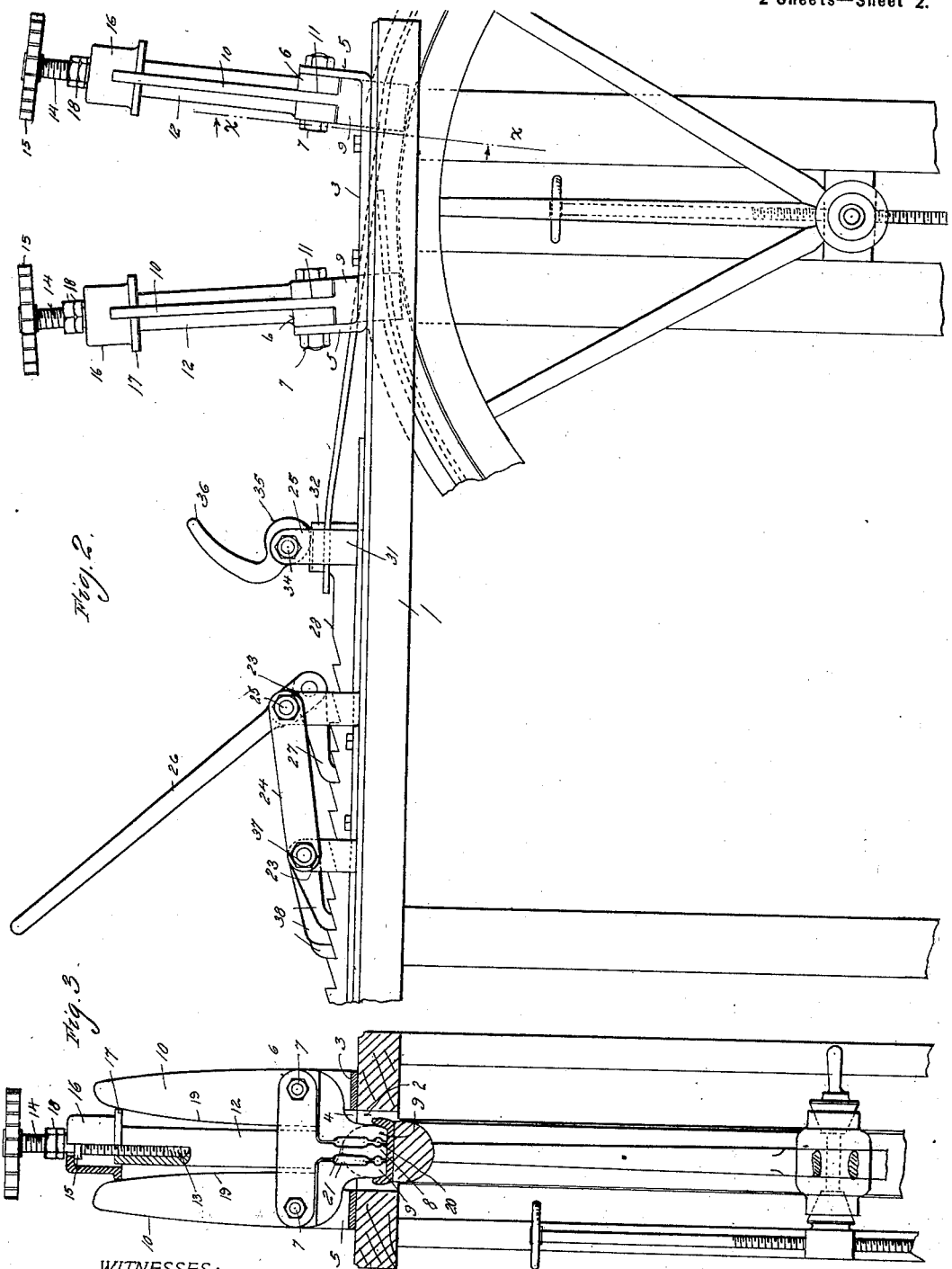

UNITED STATES PATENT OFFICE.

JOHN NEARY, OF KOKOMO, INDIANA, ASSIGNOR TO THE KOKOMO RUBBER COMPANY, OF KOKOMO, INDIANA, A CORPORATION OF INDIANA.

APPARATUS FOR APPLYING RUBBER TIRES TO VEHICLE-WHEELS.

SPECIFICATION forming part of Letters Patent No. 697,000, dated April 8, 1902.

Application filed June 3, 1901. Serial No. 62,834. (No model.)

*To all whom it may concern:*

Be it known that I, JOHN NEARY, a citizen of the United States, residing at Kokomo, in the county of Howard and State of Indiana, have invented certain new and useful Improvements in Apparatus for Applying Rubber Tires to Vehicle-Wheels, of which the following is a specification, reference being had therein to the accompanying drawings.

This invention relates to apparatus for applying rubber tires to vehicle-wheels, and is more particularly adapted for use in connection with the application of that class of tires known as "wired-on" tires, in which the tire is held in a channeled rim by means of wires passing through the body of the rubber tire and having their ends joined by brazing or otherwise.

The object of the present invention is to provide a strong, light, and simple apparatus by means of which the wires may be readily clamped and unclamped and firmly held while clamped and by means of which the necessary tension may be quickly and effectively applied to the wires.

To these ends the invention consists in certain novel features, which I will now proceed to describe and will then particularly point out in the claims.

In the accompanying drawings, Figure 1 is a perspective view of an apparatus embodying my invention in one form. Fig. 2 is a partial elevation showing a wheel in position in the apparatus, and Fig. 3 is a detail sectional view taken on the line *x x* of Fig. 2 and partly broken away to show the internal construction.

In the said drawings, in which I have shown so much of the apparatus as embodies my invention which relates to the wire holding and tensioning devices, 1 indicates a suitable bed-plate arranged horizontally and provided with a slot or opening 2, through which the wheel to which the tire is to be applied projects vertically. It will be understood, of course, that said wheel will be mounted on an adjustable support, as is usual in machines of this class, in order to adapt the machine to work on wheels of varying diameters.

Mounted on top of the bed-plate 1 is a bracket 3, slotted at 4 to correspond to the slot 2 in the bed-plate and having upstanding ends 5, to each of which is secured a yoke 6 by means of bolts 7. Each yoke 6 is provided with a downward extension 8, which forms the fixed jaws of a clamping device. The corresponding movable jaws are indicated at 9 and are formed on the lower ends of levers 10, located on opposite sides of the extension 8. These levers are pivoted on the bolts 7, the cross-head 6 being slotted, as indicated at 11, to receive the levers, which extend upward therefrom, as shown. Each cross-head is provided with an upward extension 12, preferably circular in cross-section and hollow, being threaded internally, as indicated at 13. 14 indicates a screw provided with an operating-handle 15 and fitting within the threaded upward extension 12, it being understood that each of the clamping devices is provided with one of these screws. Each screw 14 is provided with a collar 15, against which is seated the upper end of a sleeve 16, mounted on the screw 14 and provided at its lower end with a disk 17. The sleeve 16 is held in place against the collar by means of nuts 18, mounted on the threaded part of the screw above the collar. The inner faces of the upper ends of the levers 10 are inclined, as indicated at 19, and it will be seen that by turning the hand-wheel 15 the disk 17 may be forced down between the upper ends of the levers 10, so as to force said upper ends apart and cause the movable clamping-jaws 9 to approach the fixed intermediate jaw 8, while a reverse movement of the hand-wheel will withdraw the disk and release the movable clamping-jaws. The clamping-jaws are provided with grooves 20 to enable them to better grip the wires, and that one of the clamping devices which is closest to the tension device, hereinafter described, is provided between its clamping-jaws with enlarged apertures 21, through which the retaining-wires may pass loosely when said clamping-jaws are set up, so as to tightly clamp the wires within the grooves 20.

The tension device, which is also mounted on the bed-plate 1, comprises a bracket 22, having upstanding lugs 23, located in pairs at each end and connected by brace-bars 24. The pair of lugs 23 at one end of this bracket supports a pivot-bolt 25, which also serves to connect the brace-bars 24 to said lug. On this pivot-bolt is mounted a lever 26, provided with one or more pawls 27. Coöperating with this lever and its pawl or pawls is a ratchet-bar 28, mounted to slide longitudinally on the bed-plate 1, being guided by the bracket 22 and its lugs and being provided on that end which lies adjacent to the wire holding or clamping devices just described with a suitable gripping device 29. In the particular form shown this gripping device consists of a fixed jaw 30, preferably roughened on its upper surface and provided with upstanding lugs or ears 31, between which fits a movable jaw 32, grooved at the sides, as indicated at 33, to fit between the lugs 31, and preferably roughened on its under surface. The lugs 31 support a pivot-bolt 34, on which is mounted a gripping-cam 35, provided with an actuating-handle 36, by means of which said cam may be so moved as to force the movable gripping-jaw 32 against the fixed gripping-jaw 30. That pair of lugs 23 on the bracket 22 located farthest from the wire holding or clamping devices supports a pivot-bolt 37, on which are mounted a plurality of detent-pawls 38 of varying length, adapted to engage with the ratchet-bar 28.

In operating the machine it will be understood that the wheel is placed in position with the channeled rim thereof projecting up into the slot 2 and with the rubber tire placed thereon with the retaining-wires in position therein, the rubber being compressed upon the wires in the usual manner. The projecting ends of the wires adjacent to one end of the rubber tire are clamped between the fixed and movable clamping-jaws of that one of the clamping devices nearest to the tension device by being gripped within the grooves 20 thereof, this clamping of the wires being readily effected by turning the hand-wheel 15 in the manner hereinbefore described and the clamping being quickly effected, while the hold is extremely firm, owing to the action of the disk 17 on the inclined ends of the clamping-levers. The other ends of the wires are passed loosely between the jaws of the other clamping or holding device and through the enlarged apertures 21 of the clamping or holding device already in operation and are led thence to the gripping-jaws 30 and 32 on the end of the tension device, where they are firmly gripped in an obvious manner. The tension-lever 26 is then vibrated back and forward, so that the pawl or pawls 27, connected therewith, by their engagement with the ratchet-bar 28 will quickly and effectually place the necessary tension upon the retaining-wires. This tensioning of the wires is effected very rapidly by the mechanism provided for that purpose, and during the forward or non-operative stroke of the tension-lever the detent-pawls 38 serve to maintain the tension already obtained. I provide a plurality of these pawls of differing lengths, so that some one of them will always be in position to engage with a tooth of the ratchet-bar when the return movement of the tension-lever begins, thereby preventing any slip or return motion of the ratchet-bar and the consequent diminution of the tension. This construction also enables me to maintain the tension of the wires at any point to which it may be brought by the lever. After the desired tension of the wires has been obtained that one of the wire holding or clamping devices farthest from the tension device is clamped upon the wires in the manner already described, whereupon the extended ends of the wires may be cut and joined by brazing or in any other suitable manner.

I prefer to so construct the sleeve 16 that it is of larger diameter than the upward extension 12 and so that the aperture in the upper end of said sleeve is of greater diameter than the screw 14, so that said sleeve and its disk 17 are free to move laterally relatively to the parts on which they are supported. This movement is permitted by reason of the fact that a space is left between the lower one of the nuts 18 and the upper surface of the collar 15, which is slightly greater than the thickness of the upper end of the sleeve. When this construction is employed, in case of any inequality in the gripping action of the jaws the disk will be permitted to move laterally, so as to bear equally upon the upper ends of the levers and bring them both to exert a common pressure on the opposite sides of the downward extension 8, which forms the intermediate tongue or fixed jaws. I am thus enabled to make this latter extension comparatively thin, since the pressure on the opposite sides thereof is always equalized.

It is obvious that various modifications in the details of the construction may be made without departing from the principle of my invention, and I therefore do not wish to be understood as limiting myself strictly to the precise construction hereinbefore described, and shown in the accompanying drawings. For instance, although I have shown the upper ends of the pivoted levers as provided with the inclines these upper ends might be parallel and the inclinations might be provided upon the disk or other part carried by the movable sleeve, this being an obvious reversal of the construction previously described.

Having thus fully described my invention, what I claim as new, and desire to secure by Letters Patent, is—

1. A machine of the character described, comprising a bed-plate, two sets of wire clamping or holding devices thereon, a ratchet-bar mounted to slide on the bed-plate tangentially to the wheel and provided with a wire-gripping device, and a tension-lever pivotally connected with the bed-plate and provided with a pawl to engage the ratchet-bar, substantially as described.

2. A machine of the character described, comprising a bed-plate, two sets of wire clamping or holding devices thereon, a ratchet-bar mounted to slide on the bed-plate tangentially to the wheel and provided with a wire-gripping device, a tension-lever pivotally connected with the bed-plate and provided with a pawl to engage the ratchet-bar to move the same in one direction, and a detent to prevent movement of the bar in the opposite direction, substantially as described.

3. A machine of the character described, comprising a bed-plate, two sets of wire clamping or holding devices thereon, a ratchet-bar mounted to slide on the bed-plate tangentially to the wheel and provided with a wire-gripping device, a tension-lever pivotally connected with the bed-plate and provided with a pawl to engage the ratchet-bar to move the same in one direction, and a series of detent-pawls of differing lengths to prevent movement of said bar in the opposite direction, substantially as described.

4. A machine of the character described, comprising a bed-plate, two sets of wire clamping or holding devices thereon, a ratchet-bar mounted to slide on the bed-plate tangentially to the wheel and provided with a wire-gripping device consisting of a fixed jaw having lugs, a movable jaw guided by said lugs, a pivot-bolt connecting said lugs, and a cam mounted on said pivot-bolt and provided with a hand-lever, and a tension-lever pivotally connected with the bed-plate and provided with a pawl to engage the ratchet-bar, substantially as described.

5. A machine of the character described comprising a bed-plate having wire holding or clamping devices, a bracket mounted on said bed-plate and having a pair of upstanding lugs at each end, a pivot-bolt connecting each pair of lugs, a tension-lever mounted on one of said bolts and having a pawl, a detent-pawl mounted on the other bolt, and a ratchet-bar provided with a gripping device and sliding between the lugs, substantially as described.

6. In a machine of the character described, a wire-clamping device comprising a body having an extension forming the fixed jaws, pivoted levers provided with the movable jaws and having inclined ends, and a disk having a screw-feed and operating between the inclined ends of the levers, substantially as described.

7. In a machine of the character described, a wire holding or clamping device comprising a yoke having a projection extending in one direction and forming the fixed jaws, and a threaded extension in the opposite direction, a disk mounted on said last-mentioned extension and having a feeding device engaging the thread thereof, and levers pivoted on opposite sides of the yoke and having the movable jaws at one end, and inclined bearing-surfaces for the disk at the other end, substantially as described.

8. A machine of the character described, comprising a slotted bed-plate, a tension device mounted thereon, a slotted bracket straddling the slot of the bed-plate, and wire holding or clamping devices mounted at each end of the bracket, substantially as described.

In testimony whereof I affix my signature in presence of two witnesses.

JOHN NEARY.

Witnesses:
S. M. DAVIS,
EDWIN ELLIS.